(12) United States Patent
Jun et al.

(10) Patent No.: US 7,116,608 B2
(45) Date of Patent: Oct. 3, 2006

(54) LENS POSITION DETERMINATION APPARATUS OF OPTICAL PICKUP

(75) Inventors: Jong-ha Jun, Suwon (KR); Dong-ryeol Lee, Seoul (KR); Young-pyo Lee, Yongin (KR); Chul-ho Jeon, Suwon (KR); Hyun-cheal Bang, Suwon (KR); Ho-jin Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 609 days.

(21) Appl. No.: 10/631,823

(22) Filed: Aug. 1, 2003

(65) Prior Publication Data
US 2004/0062184 A1    Apr. 1, 2004

(30) Foreign Application Priority Data
Aug. 27, 2002  (KR) .............................. 2002-50755

(51) Int. Cl.
*G11B 7/00*   (2006.01)

(52) U.S. Cl. ............................... 369/44.15; 369/44.16

(58) Field of Classification Search ............. 369/44.14, 369/44.15, 44.16, 44.21
See application file for complete search history.

(56) References Cited

U.S. PATENT DOCUMENTS
5,553,052 A * 9/1996 Oono et al. ............ 369/112.17

* cited by examiner

*Primary Examiner*—Nabil Hindi
(74) *Attorney, Agent, or Firm*—Staas & Halsey LLP

(57) ABSTRACT

A lens position determination apparatus of an optical pickup includes a lens holder with a mounted lens, a base supporting the lens holder, and a pressing member. The base has an accommodation surface accommodating the lens holder and a pair of facing support walls on the accommodation surface. The pressing member is a bendable arm. A first elastic portion between arm end portions applies an elastic force in a direction in which the arm end portions closely contact the support walls. A second elastic portion connected to the arm presses the lens holder toward the accommodation surface to fix the lens holder position. The lens adjustment can be performed while the pressing force to fix the lens holder to the base is removed by bending the pressing member into a V shape to reduce frictional resistance of the lens holder with the base during the adjustment.

13 Claims, 6 Drawing Sheets

LENS POSITION DETERMINATION APPARATUS OF OPTICAL PICKUP

CROSS-REFERENCE TO RELATED APPLICATIONS

This application claims the benefit of Korean Patent Application No. 2002-50755 filed Aug. 27, 2002 in the Korean Intellectual Property Office, the disclosure of which is incorporated herein in its entirety by reference.

BACKGROUND OF THE INVENTION

1. Field of the Invention

The present invention relates to an apparatus adjusting and fixing a position of a lens included in an optical pickup of an optical storage medium recording/reproducing apparatus.

2. Description of the Related Art

In general, an optical pickup includes an optical system as shown in FIG. 1. As shown in FIG. 1, an optical system of an optical pickup includes a light source 3 emitting light having a predetermined wavelength, a grating 4 splitting the light input from the light source 3 into the $0^{th}$ order and $±1^{st}$ order, a plate type beam splitter 5 changing a proceeding path of the light emitted from the light source 3, a collimating lens 6 concentrating an incident light by changing a divergent light emitted from the light source 3 into a parallel beam, an objective lens 7 forming a light spot on a recording surface of the optical disk 1, a photodetector 9 receiving the light reflected by the recording surface of the optical disk 1 after passing through the objective lens 7, the collimating lens 6, the plate type beam splitter 5, and a concave lens 8 in order and detecting an information signal and an error signal. The concave lens 8 is disposed between the plate type beam splitter 5 and the photodetector 9 and magnifies the size of a light spot received by the photodetector 9.

The concave lens 8 is referred to as a Yo lens and its position is typically adjusted and fixed by a lens position determination apparatus as shown in FIG. 2. The lens position determination apparatus includes a lens holder 30 where the concave lens 8 is mounted, a base 10 supporting the lens holder 30, and a spring member 20 comprising a pair of pressing pieces 21 is coupled to the base 10 and elastically presses the lens holder 30 via the pressing pieces 21 toward the base 10 so that the lens holder 30 closely contacts the base 10. Thus, as the lens holder 30 is pressed by the pressing pieces 21 of the spring member 20 toward an accommodation surface 11 of the base 10, the position of the lens holder 30 is fixed. In this state, to adjust the position of the concave lens 8, an adjustment rod 40 shown in FIG. 2 is inserted in an adjustment groove 31 of the lens holder 30 and moved in directions indicated by an arrow, so that light is focused. When the adjustment rod 40 is removed after focusing, since the pressing piece 21 continues to press the lens holder 30, the changed position of the concave lens 8 is maintained.

However, in the position determination apparatus having the above structure, because the position of the concave lens 8 is adjusted by sliding the lens holder 30 in a state in which the pressing pieces 21 are still pressing the lens holder 30 toward the accommodation surface 11, frictional resistance is great so that the adjustment work is not smoothly performed. When a pressing force of the pressing piece 21 is too much, even if the lens holder 30 can slide horizontally, it slides asymmetrically in vertical and horizontal directions due to the strong frictional resistance of the pressing pieces 21 and therefore may be adjusted to an inclined position. Such an inclined position of the concave lens 8 is an unstable state, preventing formation of an accurate optical path.

SUMMARY OF THE INVENTION

The present invention provides a lens position determination apparatus of an optical pickup which can smoothly perform the adjustment of a position of the lens.

Additional aspects and advantages of the invention will be set forth in part in the description which follows and, in part, will be obvious from the description, or may be learned by practice of the invention.

The present invention may be achieved by a lens position determination apparatus of an optical pickup comprising a lens holder on which a lens is mounted, a base supporting the lens holder, and a pressing member pressing the lens holder toward the base to fix the position of the lens holder, wherein the base comprises an accommodation surface where the lens holder is accommodated and a support wall erected on the accommodation surface, and the pressing member comprises an arm having both end portions closely contacting the support wall at both sides and installed capable of bending between the support wall, a first elastic portion provided between both end portions of the arm and applying an elastic force in a direction in which both end portions of the arm closely contact the support wall, and a second elastic portion connected to the arm presses the lens holder toward the accommodation surface.

BRIEF DESCRIPTION OF THE DRAWINGS

The above and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
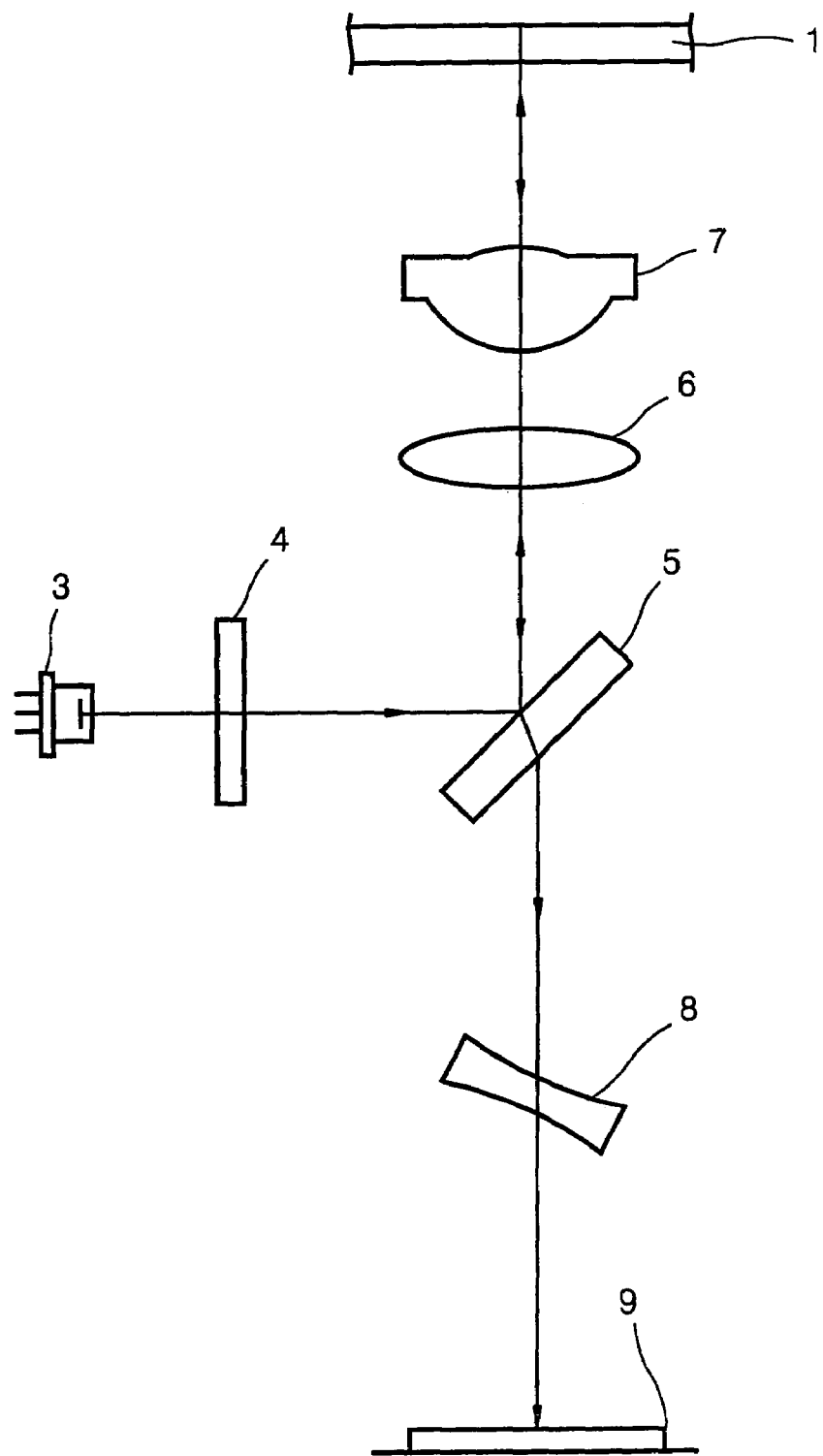
FIG. 1 is a view illustrating an optical system of a general optical pickup arranged along an optical path.
Figure 2:
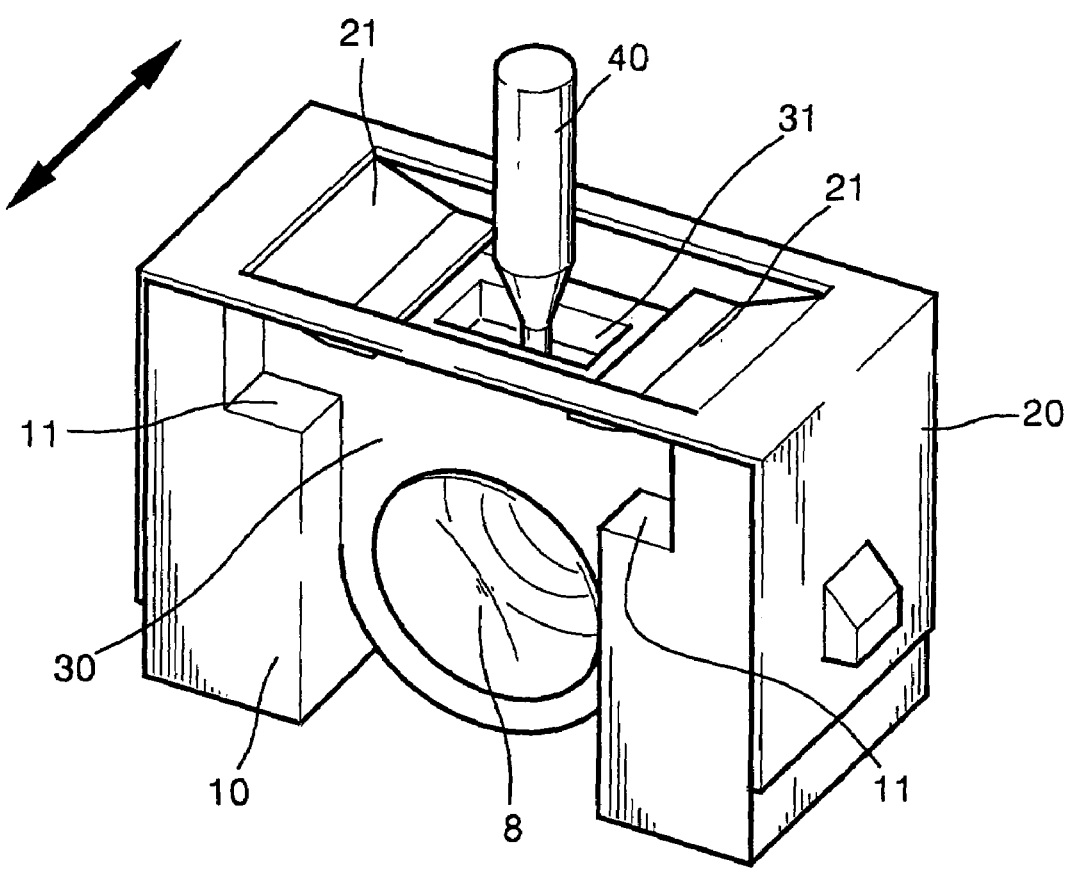
FIG. 2 is a perspective view illustrating a conventional lens position determination apparatus.

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 3:
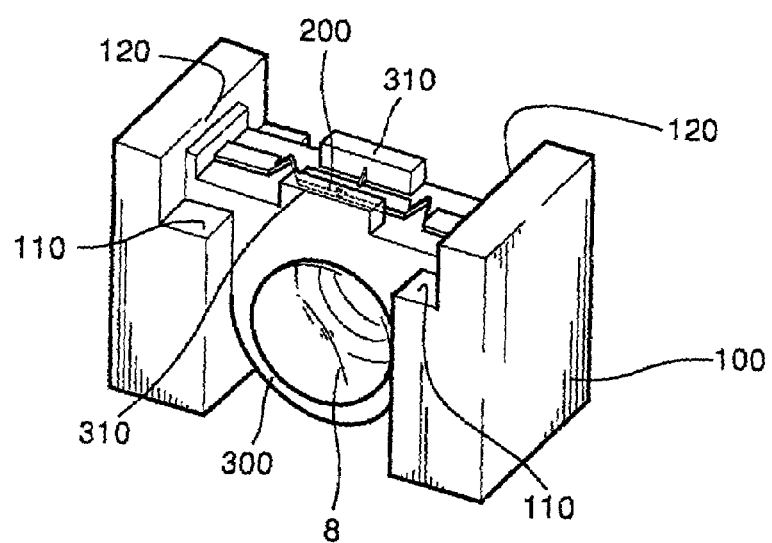
FIG. 3 is a perspective view illustrating a lens position determination apparatus according to an embodiment of the present invention.

Referring to FIG. 3, a lens position determination apparatus of an optical pickup according to an embodiment of the present invention comprises a lens holder 300 on which a lens 8, for example, a concave lens, is mounted, a base 100 where the lens holder 300 is accommodated, and a pressing member 200 pressing the lens holder 300 toward the base 100 to closely (frictionally or tightly) contact the base 100 (i.e., the lens holder 300 engages the base 100) and fix the position of the lens holder 300. The base 100 comprises accommodation surfaces 110 where the lens holder 300 is accommodated (seated) and, typically, a pair of support walls 120 is erected on the accommodation surfaces 110 at both sides of the accommodation surfaces 110 to face each other.

Figure 4:
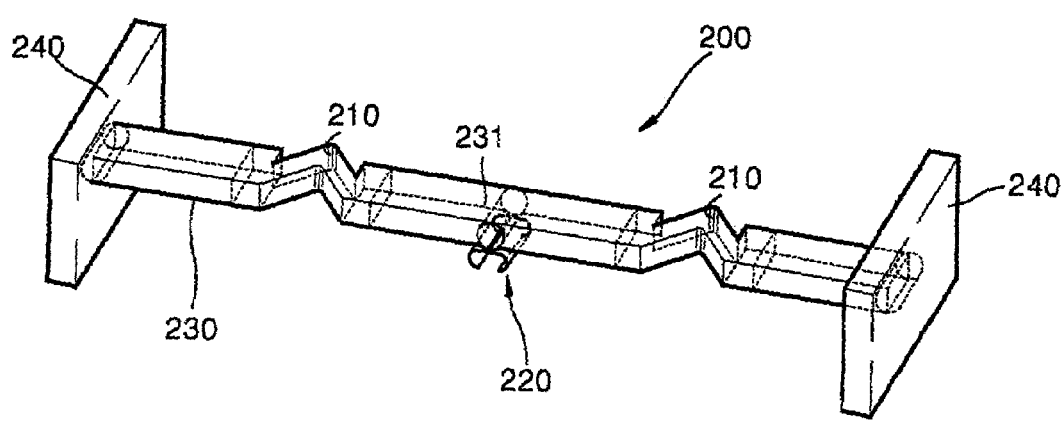
FIG. 4 is a perspective view illustrating a pressing member shown in FIG. 3.

The pressing member 200, as shown in FIG. 4, comprises an arm 230 and a pair of fixing plates 240 coupled to each end portion of the arm 230. Both end portions of the arm 230 closely (frictionally or tightly) contact the pair of support walls 120, respectively, via the fixing plates 240 so that the position of the pressing member 200 is fixed (i.e., each end portion of the arm 230 engages the base 100). A pair of first elastic portions 210 applying an elastic force in a direction in which each fixing plate 240 closely contacts the support walls 120 is provided between both end portions of the arm 230. Typically, each first elastic portion 210 is an elastic or biasing Λ shape structure (e.g., raised, dome, etc.). Therefore, each fixing plate 240 is biased towards a corresponding support wall 120. A second elastic portion 220 pressing the lens holder 300 toward the accommodation surface 110 is connected in a middle portion 231 of the arm 230. Typically, the second elastic portion 220 is an elastic (soft) cylindrical structure, such as tube (hollow or filled), or a hollow tube with an opening along the tube length. The arm 230 can be elastically bent at the middle portion 231 so that when the middle portion 231 is pressed, the arm 230 is deformed into a V shape, as a whole, and the fixing plates 240 disposed at both end portions of the arm 230 deviate from a position in which the fixing plates 240 closely contact the support walls 120 (refer to FIG. 4). Typically, a pair of stoppers 310 installed on the lens holder 300 prevents escape of the arm 230 disposed between the stoppers 310 by interfering with a horizontal movement of the middle portion 231 of the arm 230.

Figure 5:
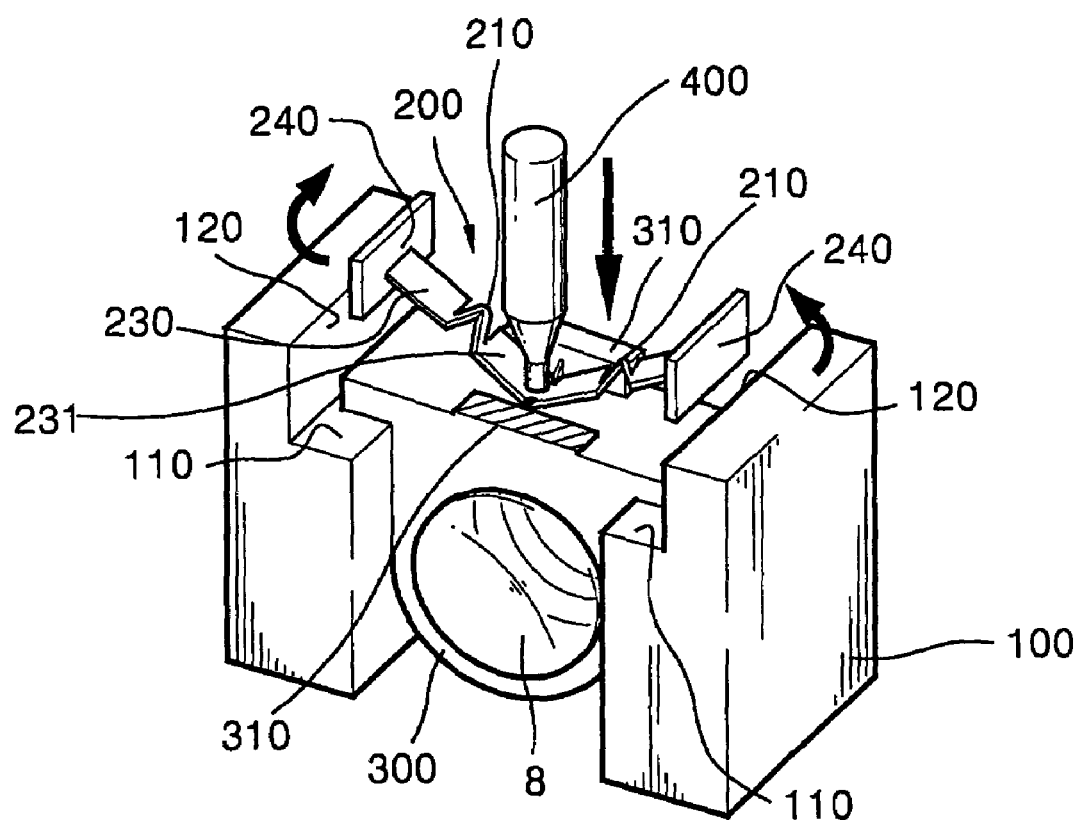
FIGS. 5 through 7 are views showing a process of adjusting the position of a lens by the lens position determination apparatus shown in FIG. 3.
Figure 6:
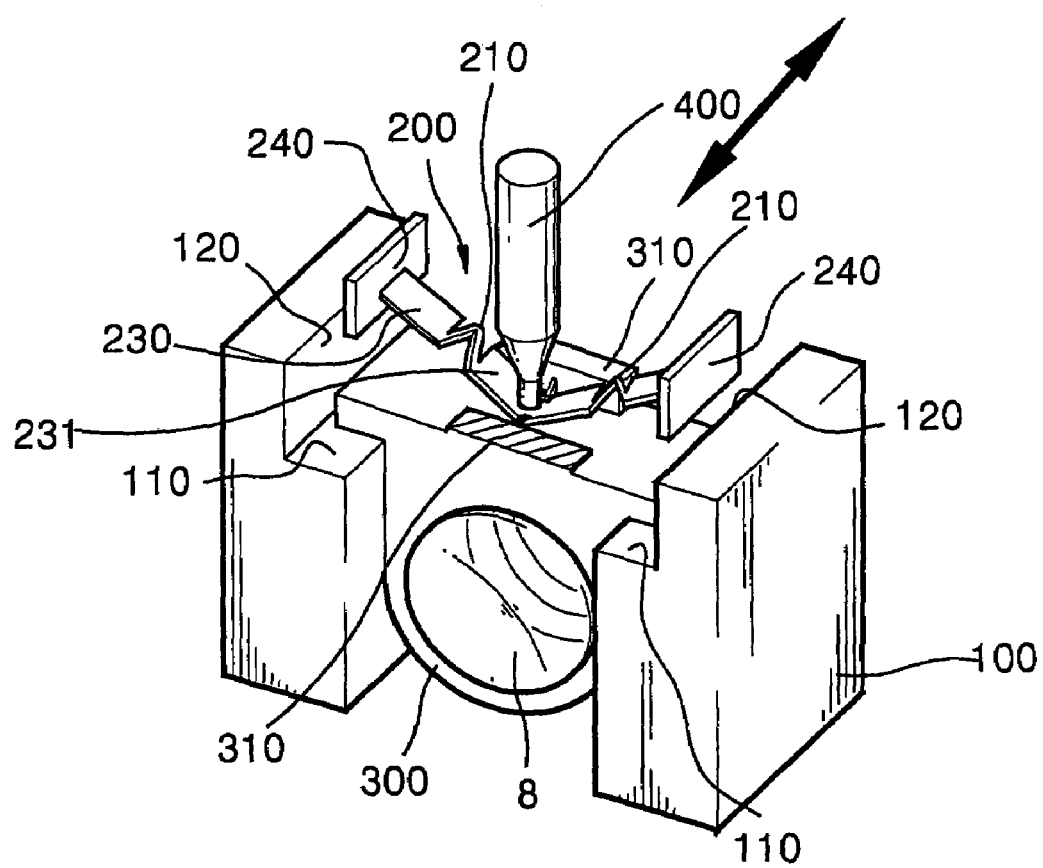
Figure 7:
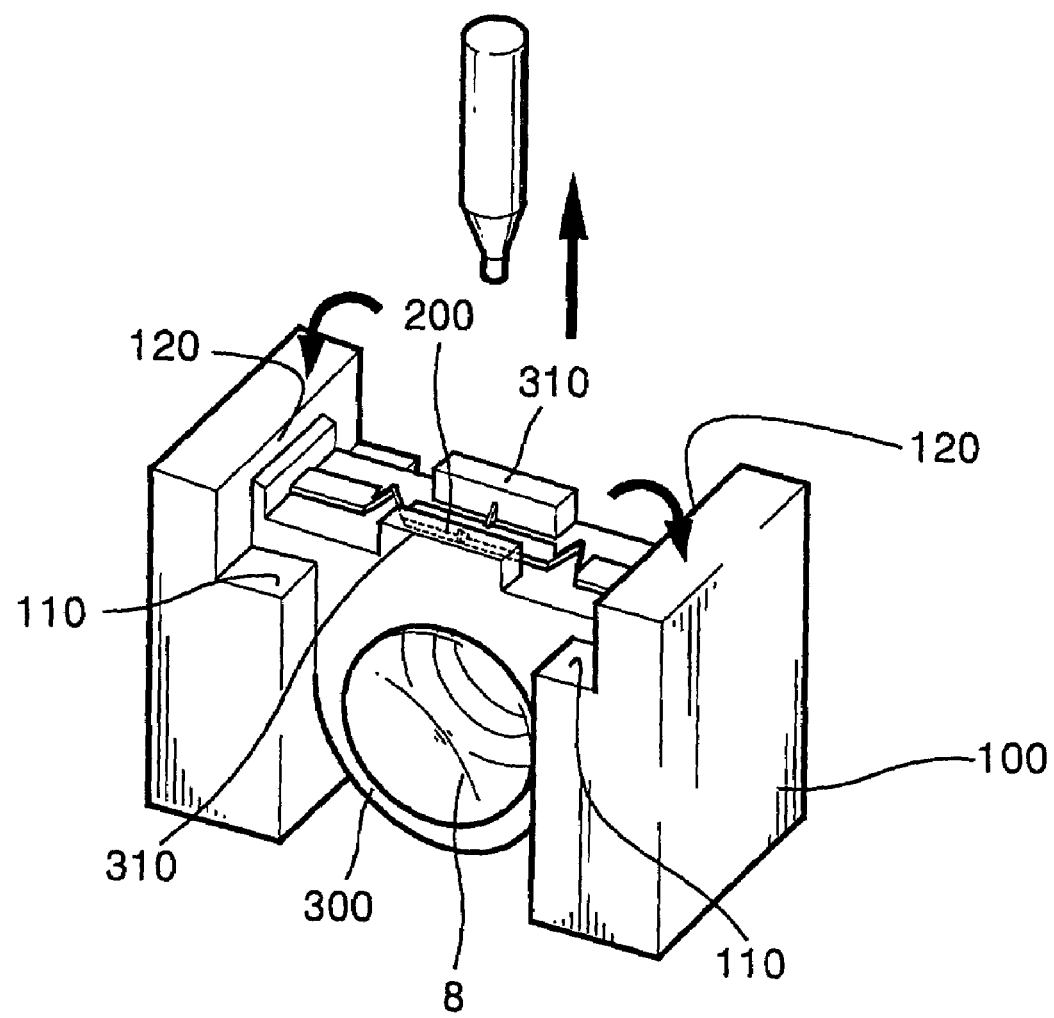

FIGS. 5 through 7 show adjustment of the position of the lens 8 in the lens position determination apparatus shown in FIGS. 3 and 4. Before adjustment, as shown in FIG. 3, the lens holder 300 is in a state of being pressed by the pressing member 200 toward the accommodation surface 110 of the base 100 so that the position of the lens holder 300 is fixed. That is, the arm 230 of the pressing member 200 receiving an elastic force of the pair of first elastic portions 210 is fixed between the support walls 120 of the base 100, such that the fixing plates 240 at each end portion of the arm 230 closely contact the support walls 120 of the base 100. The second elastic portion 220 presses the lens holder 300 toward the accommodation surface 110 of the base 100 so as not to be moved using the arm 230 as a support point of a force.

When the position of the lens 8 is adjusted as shown in FIG. 5, the middle portion 231 of the arm 230 is pressed, typically, by a member, such as an adjustment rod 400, so that the arm 230 is bent into a V shape. Then, the fixing plates 240 at each end portion of the arm 230 deviate from the original position where each fixing plate 240 closely contacts the respective support walls 120. Accordingly, pressing the adjustment rod 400 reduces a support force (i.e., reducing, including up to removing the support force) fixing the lens holder 300 in the base 100. That is, to fix the lens holder 300 in the base 100 (i.e., a fixed state), the second elastic portion 220 presses the lens holder 300 using the arm 230 as a support point of a force. However, to remove the fixed state, the arm 230 is deformed so that the lens holder 300 can be easily moved along the accommodation surfaces 110.

Thereafter, as shown in FIG. 6, in a state in which the middle portion 231 of the arm 230 is pressed, the lens holder 300 slides in a direction indicated by an arrow to adjust the position of the lens 8. After the adjustment is completed, the adjustment rod 400 is separated (removed) from the middle portion 231 of the arm 230 and the arm 230 returns to the original linear state to be fixed between the support walls 120.

Thus, in the position determination apparatus of the present invention, while the middle portion 231 of the arm 230 is pressed by an object, such as the adjustment rod 400, the lens holder 300 can be easily symmetrically horizontally pushed along the accommodation surfaces 110 of the base 100 and the position of the lens holder 300, that is, the position of the lens 8, is adjusted. When the adjustment is completed, the lens holder 300 returns to the fixed state by removing the adjustment rod 400 only. As a result, when the position of the lens 8 is to be adjusted, since the adjustment is performed in a state in which a pressing force to fix the lens holder 300 is reduced (i.e., reducing, including up to removing the pressing force), frictional resistance is decreased so that the adjustment can be performed easily and stably.

Although the arm 230 can be deformed by pressing the middle portion 231 thereof using the adjustment rod 400, since the arm 230 may be a very small part, according to an aspect of the invention, by slightly increasing the weight of the adjustment rod 400, the arm 230 can be bent only by the weight of the adjustment rod 400. Accordingly, by merely placing the adjustment rod 400, as increased in weight, on the middle portion 231, the arm 230 is bent so that the position of the lens holder 300 can be easily moved.

Accordingly, the present invention provides a lens position determination apparatus of an optical pickup used in an optical storage medium (e.g., disk) recording/reproducing apparatus, such as a CD, DVD, CD-ROM, etc., player/recorder. The lens position determination apparatus of the invention comprises a lens holder with a mounted lens, a base supporting the lens holder, and an elastic pressing member. The base has an accommodation surface accommodating the lens holder and a pair of facing support walls on the accommodation surface. For example, the elastic pressing member is a bendable pressing arm with a first elastic portion between the arm end portions and applying an elastic force in a direction in which the arm end portions closely contact the support walls. A second elastic portion connected to the arm presses the lens holder toward the accommodation surface to fix a position of the lens holder in the base. The lens adjustment can be performed while the pressing force to fix the lens holder in the base is reduced during the adjustment by bending the pressing member into a V shape to reduce frictional resistance (i.e., reducing, including up to removing the frictional resistance) of the lens holder with the base during the adjustment. In particular, the pressing force by the second elastic portion to fix the lens holder in the base can be reduced by bending the pressing member at the second elastic portion into a V shape, thereby reducing frictional resistance of the lens holder with the base by reducing frictional resistance of the arm end portion with the support walls of the base during the adjustment.

More particularly, the present invention provides a lens position adjuster comprising a lens holder with a mounted lens, a base supporting the lens holder, and an elastic pressing member frictionally fixing a position of the lens holder in the base and releasing the friction to adjust the lens holder in the base to focus the lens. The present invention is not limited to the above-described optical storage medium applications, and may be implemented as a lens adjuster for other applications using a lens, or any optical pickup system using a lens.

As is described above, the lens position determination apparatus of an optical pickup according to the present invention has the following advantages. First, since an adjustment job can be done in a state in which a pressing force to fix the lens holder is removed, frictional resistance can be reduced during the adjustment, compared to the conventional technology, so that an easy and stable adjustment can be performed. Second, since the adjustment job can be completed by moving the lens holder by pressing the middle portion of the arm using the adjustment rod and then releasing the same, the adjustment job can be done quickly and conveniently. In particular, because the lens holder pressing member of the invention allows reducing a frictional resistance of the lens holder with a base, the lens holder can be easily and stably (symmetrically) slid horizontally (back and forth with respect to a photodetector) along a supporting surface of the base, and, thus, the lens holder may be easily adjusted in a stable state to form an accurate optical path.

Although a few embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A lens position determination apparatus of an optical pickup comprising:
   a lens holder on which a lens is mounted;
   a base supporting the lens holder; and
   a bendable pressing member pressing the lens holder toward the base to fix the position of the lens holder,
   wherein the base comprises an accommodation surface where the lens holder is accommodated and a pair of facing support walls erected on the accommodation surface and the bendable pressing member is installed between the pair of facing support walls and comprises an arm having both end portions closely contacting the pair of facing support walls at both sides, a first elastic portion provided between both end portions of the arm and applying an elastic force in a direction in which both end portions of the arm closely contact the pair of facing support walls, and a second elastic portion connected to the arm and pressing the lens holder toward the accommodation surface.

2. The apparatus as claimed in claim 1, wherein the first elastic portion is provided symmetrically at both sides of the arm with respect to a middle portion of the arm.

3. The apparatus as claimed in claim 1, further comprising a fixing plate installed at both end portions of the arm and closely contacts the pair of facing support walls.

4. The apparatus as claimed in claim 1, further comprising a stopper preventing the arm from escaping in a direction opposite to the direction in which the pressing force of the second elastic portion is applied is provided at the lens holder.

5. The apparatus of claim 1, wherein the second elastic portion is provided in a center of the arm and is an elastic hollow cylindrical structure.

6. The apparatus of claim 1, wherein the bendable pressing member has a weight allowing bending of the same with a weight of a contacting rod.

7. The apparatus of claim 1, wherein the bendable pressing member is bendable in a V shape at the second elastic portion to reduce a frictional resistance of the bendable pressing arm with the support walls and to reduce the pressing force of the bendable pressing arm with the lens holder, thereby allowing stable adjustment of the lens holder.

8. An optical storage medium recording/reproducing apparatus, comprising:
   an optical pickup system comprising a lens position determination apparatus, the lens position determination apparatus comprising:
   a lens holder on which a lens is mounted;
   a base comprising an accommodation surface supporting the lens holder and a pair of facing support walls installed on the accommodation surface; and
   a bendable pressing arm frictionally installed between the pair of facing support walls and pressing the lens holder toward the base to fix a position of the lens holder.

9. The apparatus of claim 8, wherein the bendable pressing arm comprises a first elastic portion provided between both end portions of the arm and applying an elastic force in a direction in which both end portions of the arm frictionally contact the pair of facing support walls, and a second elastic portion connected to the arm and pressing the lens holder toward the accommodation surface to fix the position of the lens holder.

10. The apparatus of claim 8, wherein the bendable pressing arm is bendable in a V shape to reduce the frictional resistance of the bendable pressing arm with the support walls and to reduce the pressing force of the bendable pressing arm with the lens holder, thereby allowing stable adjustment of the lens holder.

11. The apparatus of claim 9, wherein the bendable pressing arm is bendable in a V shape at the second elastic portion to reduce the frictional resistance of the bendable pressing arm with the support walls and to reduce the pressing force of the bendable pressing arm with the lens holder, thereby allowing stable adjustment of the lens holder.

12. A lens position adjuster, comprising:
   a lens holder on which a lens is mounted;
   a base supporting the lens holder; and
   a frictionally releasable arm frictionally fixing and releasing a position of the lens holder in the base to focus the lens.

13. The lens position adjuster of claim 12, further comprising a rod used to apply a pressing force onto the frictionally releasable arm, releasing the arm and the position of the lens holder in the base to allow focusing the lens.

* * * * *